United States Patent
Shimura

(10) Patent No.: US 9,082,012 B2
(45) Date of Patent: Jul. 14, 2015

(54) EYE STATE DETECTION APPARATUS AND METHOD OF DETECTING OPEN AND CLOSED STATES OF EYE

(71) Applicant: DENSO CORPORATION, Kariya, Aichi-Pref. (JP)

(72) Inventor: Atsushi Shimura, Kariya (JP)

(73) Assignee: DENSO CORPORATION, Kariya (JP)

(*) Notice: Subject to any disclaimer, the term of this patent is extended or adjusted under 35 U.S.C. 154(b) by 422 days.

(21) Appl. No.: 13/685,804

(22) Filed: Nov. 27, 2012

(65) Prior Publication Data
US 2013/0142389 A1 Jun. 6, 2013

(30) Foreign Application Priority Data

Dec. 6, 2011 (JP) ................................. 2011-267127

(51) Int. Cl.
*G06K 9/00* (2006.01)
(52) U.S. Cl.
CPC ........ *G06K 9/00617* (2013.01); *G06K 9/00845* (2013.01)
(58) Field of Classification Search
CPC ............................ G08B 21/06; G06K 9/00845
USPC .................................................. 382/103, 104
See application file for complete search history.

(56) References Cited

U.S. PATENT DOCUMENTS

| | | | | |
|---|---|---|---|---|
| 5,805,720 A * | 9/1998 | Suenaga et al. | ............... | 382/117 |
| 5,878,156 A * | 3/1999 | Okumura | ..................... | 382/118 |
| 6,060,989 A * | 5/2000 | Gehlot | .......................... | 340/576 |
| 6,094,498 A * | 7/2000 | Okumura | ..................... | 382/118 |
| 6,097,295 A * | 8/2000 | Griesinger et al. | ........... | 340/576 |
| 6,717,518 B1 * | 4/2004 | Pirim et al. | .................... | 340/576 |
| 7,370,970 B2 * | 5/2008 | Hammoud et al. | ........... | 351/222 |
| 7,697,032 B2 * | 4/2010 | Kim et al. | ................ | 348/207.99 |
| 7,821,409 B2 * | 10/2010 | Ishida | ........................... | 340/576 |
| 8,902,070 B2 * | 12/2014 | Kobetski et al. | ............. | 340/575 |
| 2004/0179716 A1 * | 9/2004 | Tafuku et al. | ................. | 382/103 |
| 2005/0232461 A1 * | 10/2005 | Hammoud | .................... | 382/103 |
| 2006/0204041 A1 * | 9/2006 | Hammoud et al. | ........... | 382/107 |
| 2006/0204042 A1 * | 9/2006 | Hammoud et al. | ........... | 382/107 |
| 2007/0014431 A1 * | 1/2007 | Hammoud et al. | ........... | 382/103 |
| 2007/0133884 A1 * | 6/2007 | Hammoud | .................... | 382/225 |

(Continued)

FOREIGN PATENT DOCUMENTS

| | | |
|---|---|---|
| JP | A-2000-199703 | 7/2000 |
| JP | A-2001-225666 | 8/2001 |

(Continued)

*Primary Examiner* — Gandhi Thirugnanam
(74) *Attorney, Agent, or Firm* — Posz Law Group, PLC

(57) ABSTRACT

An eye state detection apparatus includes a camera, a first calculator, a memory, a second calculator, and a third calculator. The camera obtains a plurality of face images of a driver. The first calculator calculates an opening amount of an eye of the driver based on each face image. The memory stores the opening amounts calculated by the first calculator. The second calculator groups the opening amounts into a plurality of groups in a sequential manner, calculates a group distribution of each group, calculates an entire distribution of all of the opening amounts, and sets the entire distribution as a reference distribution when a difference among the group distributions is within a predetermined range. The third calculator calculates an opening degree of the eye based on the reference distribution of the opening amounts when the reference distribution of the opening amounts is calculated by the second calculator.

18 Claims, 7 Drawing Sheets

(56) References Cited

U.S. PATENT DOCUMENTS

| | | | |
|---|---|---|---|
| 2007/0286457 A1* | 12/2007 | Hammoud et al. | 382/103 |
| 2007/0291983 A1* | 12/2007 | Hammoud | 382/103 |
| 2008/0089559 A1* | 4/2008 | Koumura | 382/117 |
| 2008/0101659 A1* | 5/2008 | Hammoud et al. | 382/118 |
| 2009/0034801 A1* | 2/2009 | Hammoud | 382/107 |
| 2009/0123031 A1* | 5/2009 | Smith et al. | 382/104 |
| 2009/0310829 A1* | 12/2009 | Baba et al. | 382/118 |
| 2010/0090839 A1* | 4/2010 | Omi | 340/575 |
| 2012/0002843 A1* | 1/2012 | Yoda et al. | 382/103 |
| 2012/0219189 A1* | 8/2012 | Wu et al. | 382/103 |
| 2012/0230553 A1* | 9/2012 | Chandra Bijalwan | 382/117 |
| 2013/0142389 A1* | 6/2013 | Shimura | 382/103 |
| 2014/0205149 A1* | 7/2014 | Nakamura et al. | 382/103 |

FOREIGN PATENT DOCUMENTS

| | | |
|---|---|---|
| JP | A-2004-041485 | 2/2004 |
| JP | A-2006-109980 | 4/2006 |
| JP | A-2006-268189 | 10/2006 |
| JP | A-2007-151798 | 6/2007 |

* cited by examiner

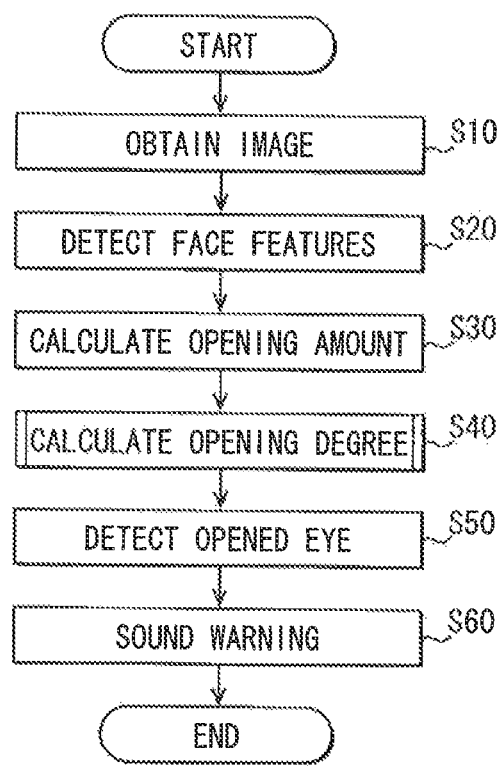

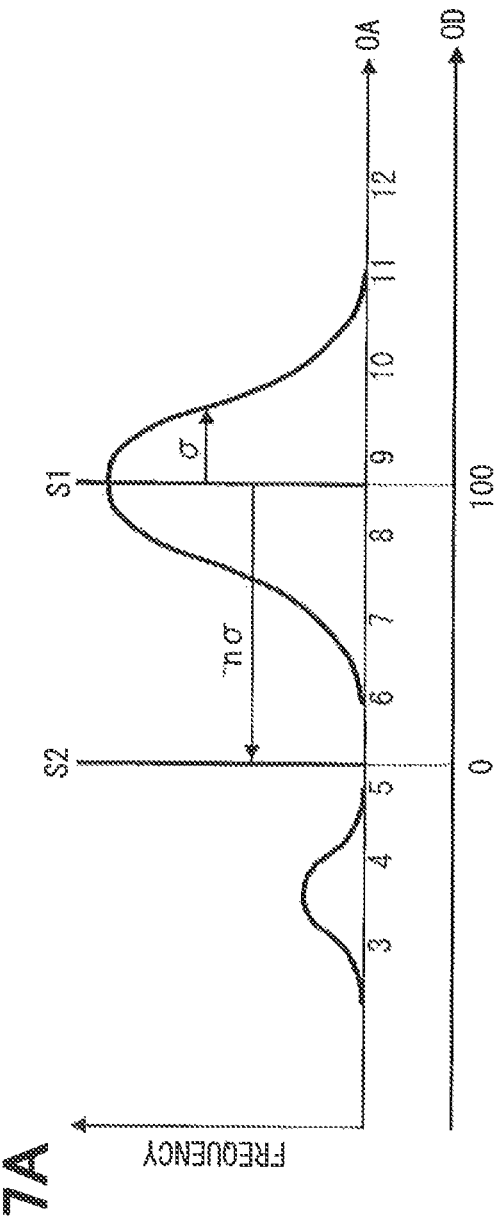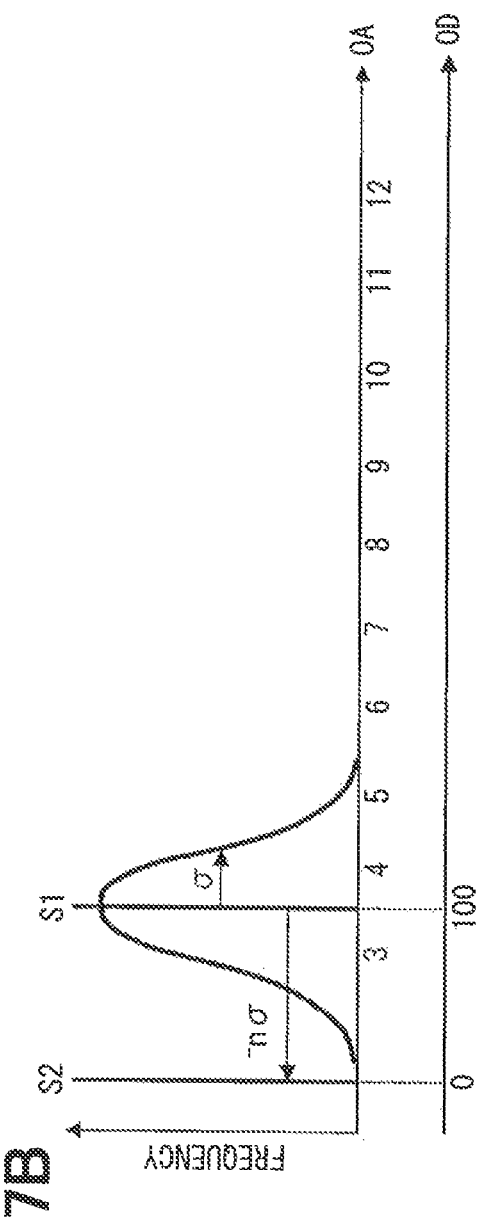

EYE STATE DETECTION APPARATUS AND METHOD OF DETECTING OPEN AND CLOSED STATES OF EYE

CROSS REFERENCE TO RELATED APPLICATION

This application is based on Japanese Patent Application No. 2011-267127 filed on Dec. 6, 2011, the disclosure of which is incorporated herein by reference.

TECHNICAL FIELD

The present disclosure relates to an eye state detection apparatus and a method of detecting open and closed states of an eye.

BACKGROUND

Conventionally, as disclosed in JP-A-2001-225666, an eye state detection apparatus, which detects an opening degree of an eye of a driver according to a face image taken by a camera, is known. The eye state detection apparatus detects the opening degree of the eye based on an opening degree reference value, which is obtained by a learning.

As described above, in JP-A-2001-225666, the eye state detection apparatus detects the opening degree of the eye based on the opening degree reference value. Thus, in a case where a state of the eye is in a predetermined state, the opening degree reference value is set improperly so that the eye state detection apparatus fails to accurately detect an open state of the eye. The predetermined state of the eye may include a state in which the eye is in a closed state for a relatively long time.

SUMMARY

In view of the foregoing difficulties, it is a first object of the present disclosure to provide an eye state detection apparatus, which accurately detects open and closed states of an eye. It is a second object of the present disclosure to provide a method of detecting open and closed states of an eye.

According to a first aspect of the present disclosure, an eye state detection apparatus includes a camera, a first calculator, a memory, a second calculator, and a third calculator. The camera obtains a plurality of face images of a driver. The first calculator calculates an opening amount of an eye of the driver based on each of the face images obtained by the camera. The memory stores the opening amounts calculated by the first calculator in a sequential manner. The second calculator groups the opening amounts stored in the memory into a plurality of groups in a time-sequential manner, calculates a group distribution of the opening amounts included in each of the groups, calculates an entire distribution of the opening amounts included in all of the groups, and sets the entire distribution of the opening amounts as a reference distribution of the opening amounts when a difference among the group distributions of all of the groups is within a predetermined range. The third calculator calculates an opening degree of the eye based on the reference distribution of the opening amounts when the reference distribution of the opening amounts is calculated by the second calculator.

In the above apparatus, an improper reference distribution of the opening amounts is less likely to be stored in the memory. Thus, the opening degree is less likely to be improperly calculated. Thus, open and closed states of the eye are accurately detected.

According to a second aspect of the present disclosure, a method of detecting open and closed states of an eye includes obtaining a plurality of face images of a driver, calculating an opening amount of an eye of the driver based on each of the face images, storing the opening amounts in a sequential manner in a memory, grouping the opening amounts stored in the memory into a plurality of groups in a time-sequential manner, calculating a group distribution of the opening amounts included in each of the groups, calculating an entire distribution of the opening amounts included in all of the groups, setting the entire distribution of the opening amounts as a reference distribution of the opening amounts when a difference among the group distributions of all of the groups is within a predetermined range, and calculating an opening degree of the eye based on the reference distribution of the opening amounts, when the reference distribution of the opening amounts is calculated.

In the above method, advantages similar to the advantages provided by the eye state detection apparatus according to the first aspect are provided.

BRIEF DESCRIPTION OF THE DRAWINGS

The above and other objects, features and advantages of the present disclosure will become more apparent from the following detailed description made with reference to the accompanying drawings. In the drawings:

FIG. 2 is a flowchart showing a process executed by the eye state detection apparatus;

FIG. 3A is a diagram showing a large opening amount of an eye, and FIG. 3B is a diagram showing a small opening amount of an eye;

FIG. 6A to FIG. 6C are diagrams respectively showing distributions of three groups of opening amounts, and FIG. 6D is a diagram showing a distribution of opening amounts included in the three groups in one diagram;

FIG. 7A and FIG. 7B are diagrams showing a calculation method of the opening degree based on the opening amounts, FIG. 7A is a diagram showing a proper reference distribution of the opening amounts, and FIG. 7B is a diagram showing an improper reference distribution of the opening amounts.

DETAILED DESCRIPTION

The following will describe embodiments of the present disclosure with reference to drawings.

1. Configuration of Eye State Detection Apparatus 1

Figure 1:
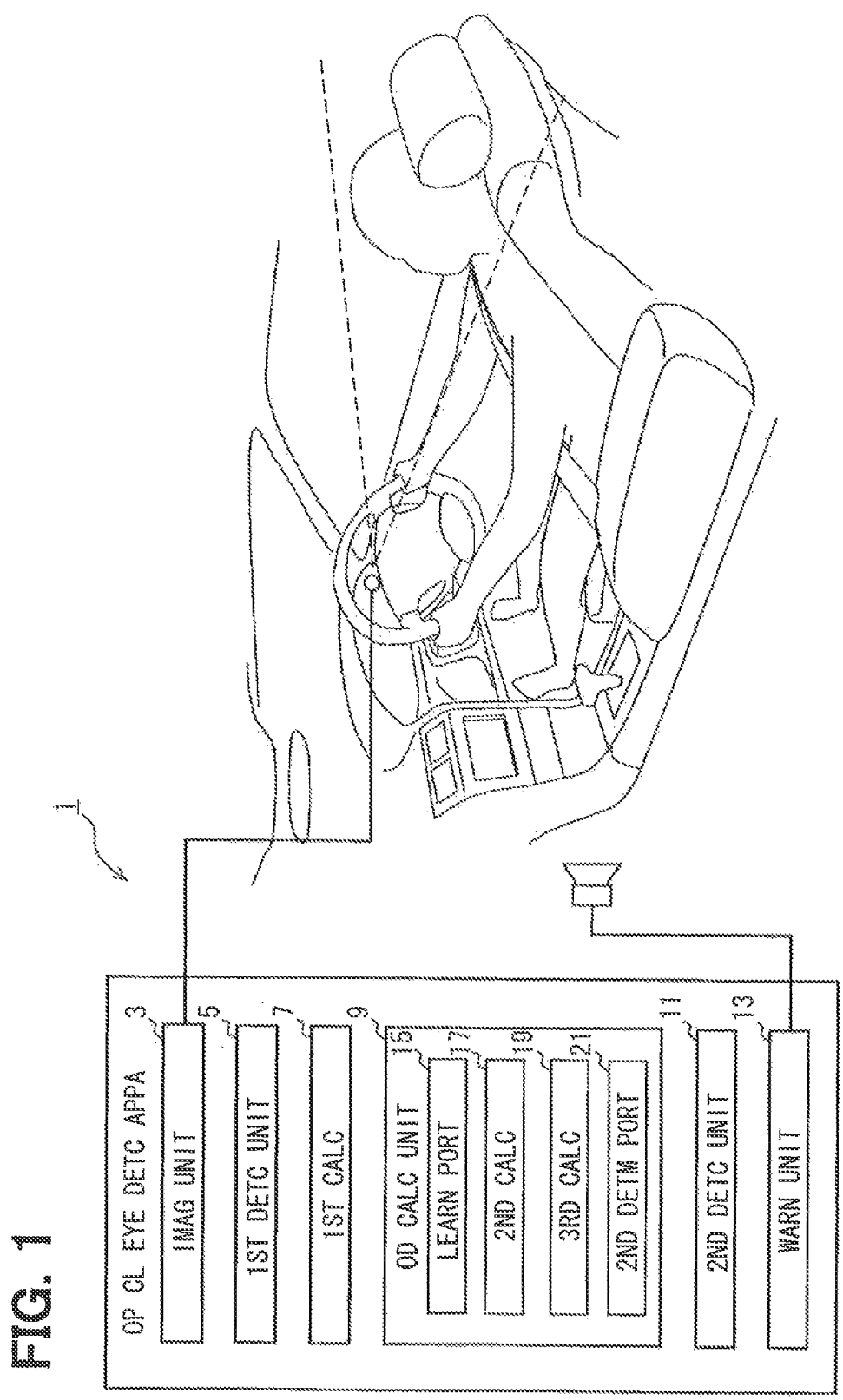
FIG. 1 is a block diagram showing a configuration of an eye state detection apparatus according to the present disclosure.

The following will describe a configuration of an eye state detection apparatus (OP CL EYE DECT APPA) 1 with reference to FIG. 1.

The eye state detection apparatus 1 includes an imaging unit (IMAG UNIT) first detect unit (1ST DETC UNIT) 5, a first calculator (1ST CALC) 7, an opening degree calculation unit (OD CALC UNIT) 9, a second detect unit (2ND DETC UNIT) 11, and a warning unit (WARN UNIT) 13. The imaging unit 3 takes an image of a face of a driver, and operates as a face image obtention means. The first detect unit 5 detects face features of the driver. The first calculator 7 obtains an opening amount (OA) of an eye of the driver, and operates as an opening amount calculation means. The opening degree calculation unit 9 includes a learning portion (LEARN PORT) 15, a first determination portion (1ST DETM PORT) 17, a third calculator (3RD CALC) 19, and a second determination portion (2ND DETM PORT) 21. The learning portion 15, which operates as a storing means, stores and performs a learning with the stored opening amounts calculated by the first calculator 7. The first determination portion 17, which operate as an opening amount reference distribution setting means, determines whether a learning of the opening amounts by the learning portion 15 can be ended. Since the first determination portion 17 calculates the distribution of the opening amounts and sets the reference distribution of the opening amounts, the first determination portion 17 is also referred to as a second calculator, hereinafter. That is, the first determination portion 17 determines whether a storing of the opening amounts by the learning portion 15 can be ended. The third calculator 19, which operates as an opening degree calculation means, calculates an opening degree (OD) of the eye based on a distribution of the opening amounts. The second determination portion 21, which operates as a monitoring means, determines whether a relearning needs to be performed. The second detect unit 11 detects a closed state of the eye of the driver based on the opening degree calculated by the third calculator 19. The warning unit 13 sounds a warning to the driver when the second detect unit 11 detects the closed state of the eye of the driver.

The eye state detection apparatus 1 is equipped to a vehicle. The imaging unit 3 is provided by a camera equipped in the vehicle so that the face of the driver is taken by the camera. Hereinafter, an image including the face of the driver is also referred to as a face image. The first calculator 7, the opening degree calculation unit 9, and the second detect unit 11 are provided by a controller. The controller may be provided by a computer, and executes a process to function as the first calculator 7, the opening degree calculation unit 9, and the second detect unit 11. The process, which is executed by the controller to operate as the first calculator 7, the opening degree calculation unit 9, and the second detect unit 11, will be described later. The warning unit 13 is provided by a speaker. The speaker is equipped in the vehicle and sounds a warning.

2. Process Executed by Eye State Detection Apparatus 1

A process executed by the eye state detection apparatus 1 will be described with reference to FIG. 2 to FIG. 8. FIG. 2 shows a flowchart of a process, which is periodically and repeatedly executed by the eye state detection apparatus 1.

As shown in FIG. 2, when the process starts, at S10, the imaging unit 3 obtains the face image of the driver. At S20, the first detect unit 5 detects a position of the eye of the driver and positions of an upper eyelid and a lower eyelid of the eye based on the face image obtained at S10. The detection of positions of the face features, in this case, the eye and the eyelids may apply a well-known image analysis technology.

Figure 3A:
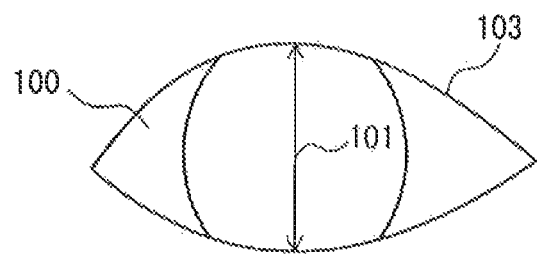
FIG. 3A and FIG. 3B are diagrams showing opening amounts of an eye.
Figure 3B:
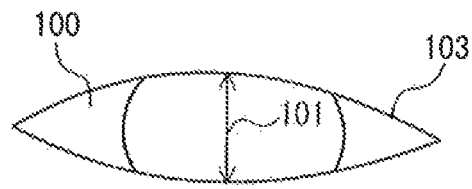

At S30, the first calculator 7 calculates opening amounts of the eye. Specifically, the first calculator 7 calculates each opening amount of the eye at a predetermined time based on the position of the eye and the positions of the upper eyelid and the lower eyelid at the predetermined time. As shown in FIG. 3A and FIG. 3B, the opening amount may be set as a width 101 between the upper eyelid and the lower eyelid. Further, the opening amount may also be set as a degree 103 of a curvature of the upper eyelid. The opening amount may be calculated based on a well-known image analysis technology disclosed in JP-A-2007-151798.

Figure 4:
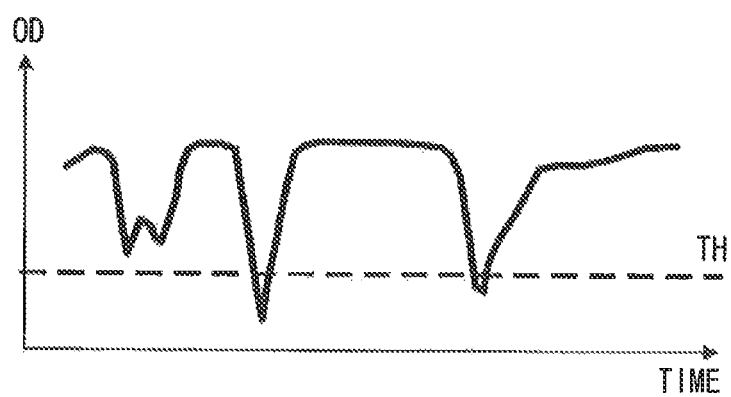
FIG. 4 is a diagram showing a threshold value for a warning determination.

At S40, the opening degree calculation unit 9 calculates an opening degree based on the opening amounts calculated at S30. A calculation process of the opening degree at S40 will be described later in detail. At S50, as shown in FIG. 4, the second detect unit 11 compares the opening degree (OD) calculated at S40 with a threshold value (TH). The eye is determined to be open or closed based on the threshold value. The threshold value is a predetermined value, which is preliminarily set for determining the closed state of the eye.

When the second detect unit 11 determines that the opening degree is smaller than the threshold value for a relatively long time period, at S60, the warning unit 13 sounds the warning to the driver. When the second detect unit 11 determines that the opening degree is larger than the threshold value, the warning unit 13 does not sound the warning. Then, the eye state detection apparatus 1 ends the process.

Figure 5:
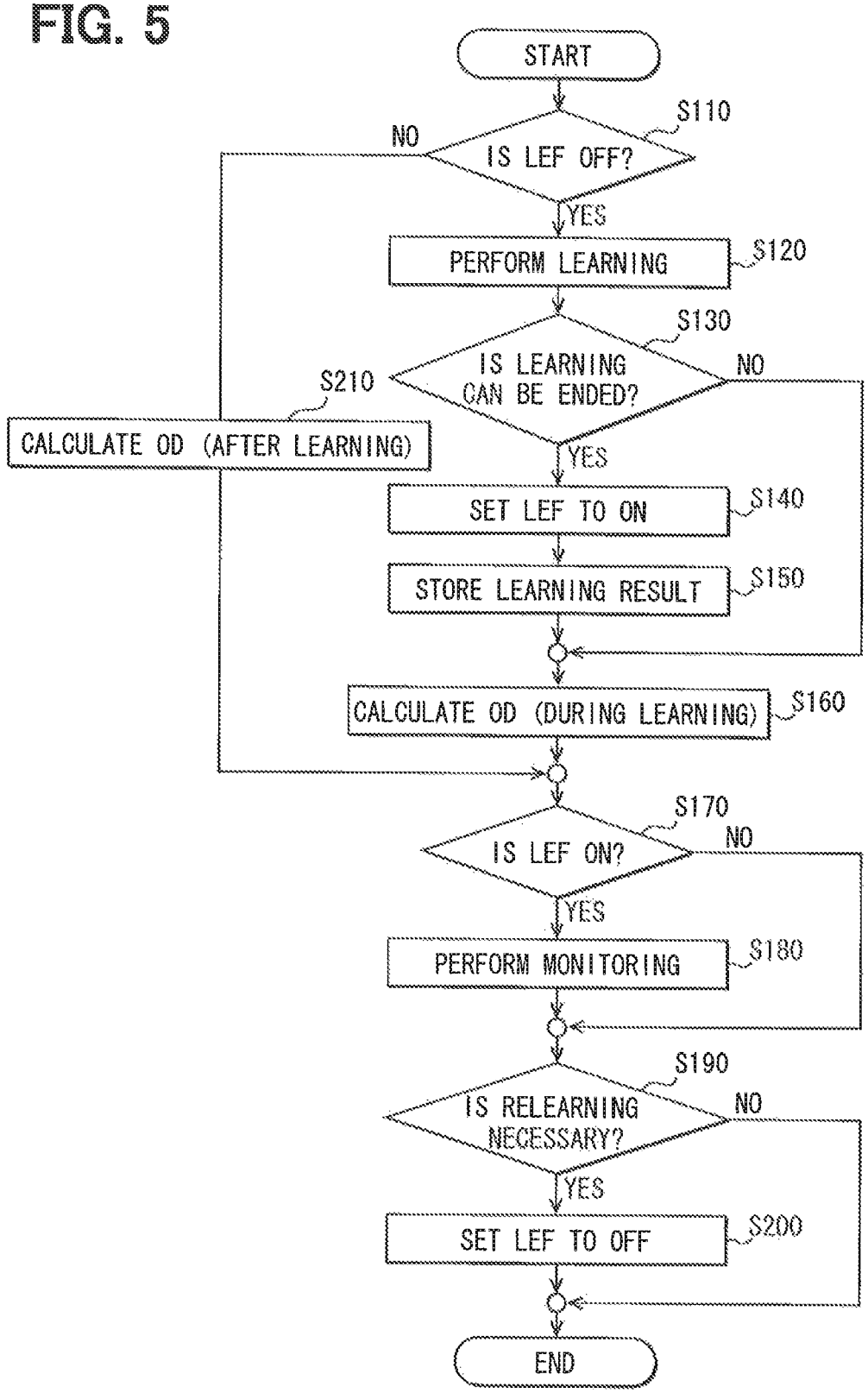
FIG. 5 is a flowchart showing a process for calculating an opening degree of an eye.

The following will describe the calculation process of the opening degree executed by the opening degree calculation unit 9 at S40. As shown in FIG. 5, at S110, the opening degree calculation unit 9 determines whether a value of a learning end flag (LEF) is OFF. The learning end flag indicates whether a learning of the opening amount can be ended. Specifically, when the first determination portion 17 determines that the learning can be ended at S130, which will be described later, the value of the learning end flag is set to ON. Further, until the first determination portion 17 determines that the learning can be ended at S130, the learning end flag maintains the value OFF. Further, when the second determination portion 21 determines that a relearning needs to be performed at S190, the value of the learning end flag is set to OFF. At S110, when the opening degree calculation unit 9 determines that the value of the learning end flag is OFF, the opening degree calculation unit 9 proceeds to S120. At S110, when the opening degree calculation unit 9 determines that the value of the learning end flag is ON, the opening degree calculation unit 9 proceeds to S210.

At S120, the opening degree calculation unit 9 executes a learning process. Specifically, the learning portion 15 stores a latest opening amount calculated at S30 in a memory (not shown) included in the learning portion 15. In the storage media, opening amounts calculated during elapsed 3N seconds are sequentially stored. Herein, N is defined as a positive constant number. Additionally, at S120, the learning portion 15 stores the latest opening amount calculated at S30 in the storage media together with the opening amounts calculated during the elapsed 3N seconds.

At S130, the opening degree calculation unit 9 determines whether the learning can be ended. Specifically, the first determination portion 17 determines whether the learning can be ended. The first determination portion 17 groups the opening amounts stored in the learning portion 15 into three groups including group A, group B and group C. The three groups of the opening amounts are grouped in a time-sequential manner. Specifically, the group A includes opening amounts stored from 3N seconds before to 2N seconds before, the group B includes opening amounts stored from 2N seconds before to N seconds before, and the group C includes opening amounts from N seconds before to a present time.

Figure 6A:
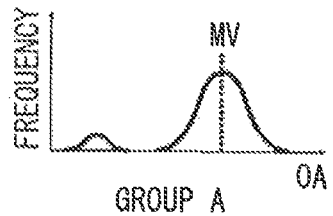
FIG. 6A to FIG. 6D are diagrams showing a determination method of ending a learning.
Figure 6B:
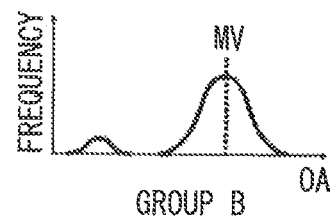
Figure 6C:
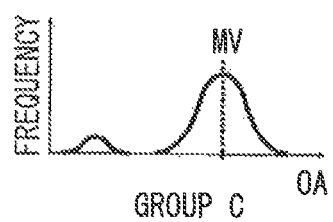

As shown in FIG. 6A, the first determination portion 17 calculates a group distribution of the opening amounts of each group. FIG. 6A shows a group distribution of the opening amounts of group A, FIG. 6B shows a group distribution of the opening amounts of group B, and FIG. 6C shows a group distribution of the opening amounts of group C. In each of FIG. 6A to FIG. 6C, the horizontal axis indicates an opening amount, and the vertical axis indicates a frequency. Each group distribution of the opening amounts has a first modal value range, which indicates the open state of the eye, and a second modal value range, which indicates the closed state of the eye. The first modal value range has a mode value (MV), which is placed at a center of the first modal value range. Herein, the mode value is an opening amount that has a highest frequency. When a difference among the three mode values of the three groups A, B, C is within a predetermined range, the first determination portion 17 determines that the learning can be ended. That is, among the three mode values of the three groups A, B, C, a difference between a largest mode value and a smallest mode value is smaller than a predetermined value, the first determination portion 17 determines that the learning can be ended. When the difference among the three mode values of the three groups A, B, C is out of the predetermined range, the first determination portion 17 determines that the learning cannot be ended. Further, when the number of the opening amounts included in the three groups A, B, C is less than a lower limit, the first determination portion 17 determines that the learning cannot be ended. At S130, when the first determination portion 17 determines that the learning can be ended, the opening degree calculation unit 9 proceeds to S140. At S130, when the first determination portion 17 determines that the learning cannot be ended, the opening degree calculation unit 9 proceeds to S160.

At S140, the opening degree calculation unit 9 sets the value of the learning end flag to ON.

Figure 6D:
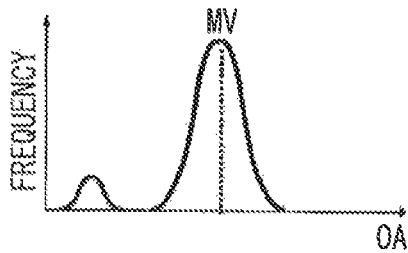

At S150, the opening degree calculation unit 9 stores a result of the learning executed at S120. Specifically, as shown in FIG. 6D, the opening degree calculation unit 9 calculates an entire distribution of the opening amounts included in the three groups A, B, C. That is, the opening degree calculation unit 9 calculates the entire distribution of the opening amounts stored during the elapsed 3N seconds. Similar to FIG. 6A to FIG. 6C, in FIG. 6D, the horizontal axis indicates an opening amount, and the vertical axis indicates a frequency. The opening degree calculation unit 9 stores, to the learning portion 15, the entire distribution of the opening amounts shown in FIG. 6D as a reference distribution of the opening amounts.

At S160, as shown in FIG. 7A and FIG. 7B, the opening degree calculation unit 9 calculates an opening degree based on the opening amounts calculated at S30. Specifically, the third calculator 19 calculates a distribution of the opening amounts included in the three groups A, B, C. In each of FIG. 7A and FIG. 7B, the horizontal axis indicates an opening amount, and the vertical axis indicates a frequency. When the distribution of the opening amounts is already calculated and stored in the learning portion 15 as the reference distribution of the opening amounts, the third calculator 19 calculates the distribution of the opening amounts based on the reference distribution of the opening amounts stored in the learning portion 15. When the reference distribution of the opening amounts is not stored in the learning portion 15, the third calculator 19 calculates the distribution of the opening amounts based on lastly stored opening amounts during the elapsed 3N seconds from the present time. The lastly stored opening amounts during a predetermined time, in this case, 3N seconds, is also referred to as last opening amounts. In this case, the predetermined time starts at 3N seconds before the present time and ends at the present time. Further, opening amounts which are previously stored during the predetermined time, in this case, 3N seconds, is also referred to as previous opening amounts. In this case, the predetermined time starts at earlier than 3N seconds before the present time and ends earlier than the present time.

As shown in FIG. 7A, an opening amount, which has a highest frequency, is defined as a mode value S1. Further, an opening amount, which is smaller than the mode value S1 by n times of standard deviation (nu), is defined as a threshold value S2. Herein, n is defined as a positive integer and is properly defined so that the threshold value S2 is placed at a predetermined position, which will be described later. For example, n may be set to 3. When the distribution of the opening amounts is a standard distribution, the mode value is placed at a center of the first modal value range, which indicates the open state of the eye, and the threshold value S2 is placed at a position, which corresponds to an opening amount smaller than a smallest value of the modal value range. Further, as described above, the threshold value is used for determining the open state and the closed state of the eye. In the present disclosure, the closed state of the eye is defined as a state in which the opening degree of the eye is lower than the threshold value S2. Thus, the closed state of the eye is determined based on the threshold value S2, and is different from an actually closed state of the eye. Usually, the width 101 between the upper lid and the lower lid of the eye is zero when the eye is actually closed. However, in the present disclosure, when the width 101 between the upper lid and the lower lid of the eye is greater than zero and smaller than the threshold value S2, the eye is determined to be closed.

The opening degree may be defined based on a relationship among each opening amount, the mode value S1, and the threshold value S2.

The following will describe an example of definition method of the opening degree. Specifically, the opening degree is defined to have a value within a range from zero to 100 as shown in FIG. 7A and FIG. 7B.

(i) When the opening amount has the mode value S1, the opening degree is defined to have the value 100.

(ii) When the opening amount has the threshold value S2, the opening degree is defined to have the value zero.

(iii) The values of the opening degree between zero to 100, which correspond to the mode value S1 to the threshold value S2 of the opening amounts, may be defined linearly or non-linearly in a complementary manner.

According to the above-described definitions, the third calculator 19 calculates the opening degree based on the opening amounts calculated at S30. At S170, the opening degree calculation unit 9 determines whether the value of the learning end flag is ON. When the opening degree calculation unit 9 determines that the value of the learning end flag is ON, the opening degree calculation unit 9 proceeds to S180. When the opening degree calculation unit 9 determines that the value of the learning end flag is OFF, the opening degree calculation unit 9 proceeds to S190.

At S180, the opening degree calculation unit 9 executes a monitoring process. Specifically, the opening degree calculation unit 9 calculates a monitoring distribution of the opening amounts based on the opening amounts stored for a predetermined monitoring time after the reference distribution of the opening amounts is stored in the learning portion 15. Hereinafter, the distribution of the opening amounts calculated at S180 is also referred to as a monitoring distribution of the opening amounts.

Figure 8:
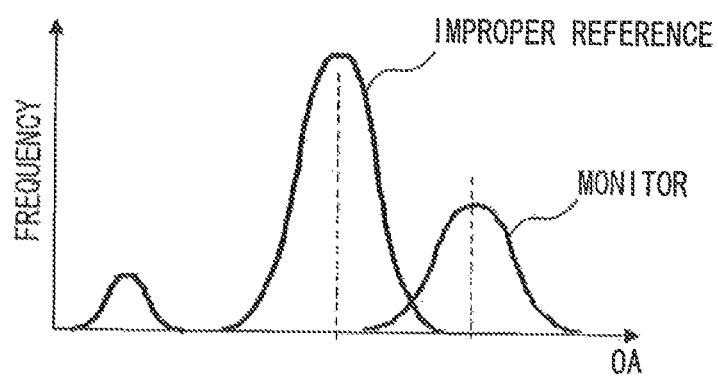
FIG. 8 is a diagram showing a case in which a relearning needs to be performed.

At S190, the opening degree calculation unit 9 determines whether the relearning needs to be performed. Specifically, the second determination portion 21 compares the reference distribution of the opening amounts with the monitoring distribution of the opening amounts. As shown in FIG. 8, when a difference between the two mode values of the reference distribution of the opening amounts and the monitoring distribution of the opening amounts is larger than a predetermined value, the opening degree calculation unit 9 determines that the reference distribution of the opening amounts is an improper reference distribution of the opening amounts. Thus, the opening degree calculation unit 9 determines that the relearning needs to be performed. Further, when (i) the difference between the two mode values is larger than the predetermined value and (ii) a mode value of the monitoring distribution of the opening amounts is larger than the mode value of the reference distribution of the opening amounts, the opening degree calculation unit 9 may determine that the relearning needs to be performed. Then, the opening degree calculation unit 9 proceeds to S200. At S200, the opening degree calculation unit 9 sets the value of the learning end flag to OFF, and ends the calculation process of the opening degree. Further, at S190, when (i) the mode value of the monitoring distribution of the opening amounts is smaller or equal to the mode value of the reference distribution of the opening amounts, or (ii) the difference between the two mode values is smaller or equal to the predetermined value, the opening degree calculation unit 9 determines that the relearning can be skipped. Then, the opening degree calculation unit 9 ends the calculation process of the opening degree.

At S110, when the opening degree calculation unit 9 determines that the value of the learning end flag is ON, the opening degree calculation unit 9 proceeds to S210. At S210, the third calculator 19 calculates the opening degree in a similar manner to the calculation of the opening degree at S160. Compared with S160, at S210, the opening degree is calculated based on the reference distribution of the opening amounts. At S160, the opening degree is calculated based on the reference distribution of the opening amounts when the reference distribution of the opening amounts is previously stored in the learning portion 15.

3. Advantages Provided by Eye State Detection Apparatus 1

(1) As described above, the eye state detection apparatus 1 calculates the opening degree of the eye of the driver, and sounds the warning to the driver based on a comparison result of the opening degree with the threshold value. Thus, when the opening degree of the eye of the driver is smaller than the threshold value, the driver of the vehicle can be warned by the eye state detection apparatus 1 thereby improving a drive safety.

(2) The eye state detection apparatus 1 obtains the reference distribution of the opening amounts by a learning executed at S120. Then, a condition for ending the learning is set at S130. With this configuration, an improper reference distribution of the opening amounts is less likely to be stored in the eye state detection apparatus 1. Thus, the opening degree is less likely to be improperly calculated. For example, when the eye is in the closed state for a relatively long time period, opening amounts of the eye during the relatively long time period is stored in the eye state detection apparatus 1. Thus, the reference distribution of the opening amounts is improperly calculated. Accordingly, the opening degree, which is calculated based on the reference distribution of the opening amounts, is also improperly calculated. In the present embodiment, the condition for ending the learning of the reference distribution of the opening amounts is set at S130 as described above. Thus, when the eye is in the closed state for the relatively long time period and the opening amounts of the eye during the relatively long time period are stored as one of the three groups A, B, C, the group including the opening amounts during the relatively long time period has a mode value, which is substantially different from mode values of other sets. Thus, the first determination portion 17 determines that the learning cannot be ended at S130 (S130: NO), and the improper reference distribution of the opening amounts is not stored in the eye state detection apparatus 1.

(3) The eye state detection apparatus 1 executes the monitoring process (S180) and the determination of the relearning (S190) after the reference distribution of the opening amounts is stored. When the eye state detection apparatus 1 determines that the relearning needs to be performed, the reference distribution of the opening amounts is reset via S200, S110, S120. Thus, when an improper reference distribution of the opening amounts is stored, the improper reference distribution of the opening amounts can be replaced by a proper reference distribution of the opening amounts. For example, as shown in FIG. 7B, when all of the opening amounts included in the three groups A, B, C are stored during the closed state of the eye, the improper reference distribution of the opening amounts is stored in the eye state detection apparatus 1. When the eye state detection apparatus 1 executes the monitoring process at S180, a proper reference distribution of the opening amounts is calculated by the monitoring process. In this case, as shown in FIG. 8, a mode value of the improper reference distribution is substantially larger than a mode value of the proper reference distribution obtained by the monitoring process. Thus, the second determination portion 21 determines that the relearning needs to be performed (S190: YES), and the relearning of the reference distribution of the opening amounts is performed.

(4) When the reference distribution of the opening amounts is not set, the eye state detection apparatus 1 calculates the opening degree based on a distribution of the opening amounts, which are calculated from the latest opening amounts stored in the learning portion 15. Thus, just after the eye state detection apparatus 1 is powered on and the eye state detection apparatus 1 has no reference distribution of the opening amounts stored in the learning portion, the opening degree of the eye may be calculated based on the latest opening amounts, which are lately stored in the learning portion for the predetermined time period.

(5) When the difference among the mode values of the three groups of the opening amounts is within the predetermined range, the distribution of the opening amounts included in all of the three groups is defined as the reference distribution of the opening amounts. With this configuration, the reference distribution of the opening amounts is easily calculated.

(6) The opening degree of the eye is calculated based on the mode value S1 and the threshold value S2 of the reference distribution of the opening amounts. Specifically, the opening degree may be defined by a ratio of each opening amount to the mode value S1 and a ratio of each opening amount to the threshold value S2. With this configuration, the opening degree of the eye is easily calculated.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. An eye state detection apparatus comprising:
   a camera that obtains a plurality of face images of a driver;
   a first calculator that calculates an opening amount of an eye of the drier based on each of the face images obtained by the camera;
   a memory that stores the opening amounts calculated by the first calculator in a sequential manner;

a second calculator:
grouping the opening amounts stored in the memory into a plurality of groups in a time-sequential manner;
calculating a group distribution of the opening amounts included in each of the groups; and
calculating an entire distribution of the opening amounts included in all of the groups, and setting the entire distribution of the opening amounts as a reference distribution of the opening amounts when a difference among the group distributions of all of the groups is within a predetermined range; and
a third calculator that calculates an opening degree of the eye based on the reference distribution of the opening amounts when the reference distribution of the opening amounts is calculated by the second calculator.

2. The eye state detection apparatus according to claim 1, further comprising:
a fourth calculator that calculates a monitoring distribution of opening amounts, the monitoring distribution of the opening amounts being calculated based on the opening amounts stored during a predetermined time period after the reference distribution of the opening amounts is calculated,
wherein, when a difference between the reference distribution of the opening amounts and the monitoring distribution of the opening amounts is larger than a predetermined value, the second calculator recalculates the reference distribution of the opening amounts.

3. The eye state detection apparatus according to claim 1, wherein the second calculator calculates a mode value of each group of the opening amounts, and
wherein, when a difference among the mode values of all of the groups is within a predetermined range, the second calculator determines that the difference among the group distributions of all of the groups is within the predetermined range.

4. The eye state detection apparatus according to claim 1, wherein, when the reference distribution of the opening amounts is not set by the second calculator, the third calculator calculates the opening degree of the eye based on a distribution of the opening amounts stored in the memory.

5. The eye state detection apparatus according to claim 1, wherein the opening amount of the eye is referred to as a width between an upper eyelid and a lower eyelid of the eye.

6. The eye state detection apparatus according to claim 1, wherein the opening amount of the eye is referred to as a curvature of an upper eyelid of the eye.

7. The eye state detection apparatus according to claim 1, wherein the third calculator:
calculates a mode value of the reference distribution of the opening amounts;
sets a threshold value of the reference distribution of the opening amounts, the threshold value being smaller than the mode value; and
calculates the opening degree of the eye based on a relationship among each of the opening amounts, the mode value, and the threshold value.

8. The eye state detection apparatus according to claim 7, wherein the threshold value is set smaller than the mode value by n times of standard deviation,
wherein n is defined as a positive integer,
wherein, when the opening amount has the mode value, the opening degree is set to 100,
wherein, when the opening amount has the threshold value, the opening degree is set to zero,
wherein, values of the opening degree between zero to 100 are complementarily set in a linear Manner or in a non-linear manner.

9. An eye state detection apparatus comprising:
a face image obtention means for obtaining a plurality of face images of a driver;
an opening amount calculation means for calculating an opening amount of an eye of the driver based on each of the face images obtained by the face image obtention means;
a storing means for storing the opening amounts calculated by the opening amount calculation means in a sequential manner;
an opening amount reference distribution setting means for:
grouping the opening amounts stored in the storing means into a plurality of groups in a time-sequential manner;
calculating a group distribution of the opening amounts included in each of the groups; and
calculating an entire distribution of the opening amounts included in all of the groups, and setting the entire distribution of the opening amounts as a reference distribution of the opening amounts when a difference among the group distributions of all of the groups is within a predetermined range; and
an opening degree calculation means for calculating an opening degree of the eye based on the reference distribution of the opening amounts when the reference distribution of the opening amounts is calculated by the opening amount reference distribution setting means.

10. The eye state detection apparatus according to claim 9, further comprising:
a monitoring means for calculating a monitoring distribution of opening amounts, the monitoring distribution of the opening amounts being calculated based on the opening amounts stored during a predetermined time period after the reference distribution of the opening amounts is calculated,
wherein, when a difference between the reference distribution of the opening amounts and the monitoring distribution of the opening amounts is larger than a predetermined value, the opening amount reference distribution setting means recalculates the reference distribution of the opening amounts.

11. The eye state detection apparatus according to claim 9, wherein the opening amount reference distribution setting means calculates a mode value of each group of the opening amounts, and
wherein, when a difference among the mode values of all of the groups is within a predetermined range, the opening amount reference distribution setting means determines that the difference among the group distributions of all of the groups is within the predetermined range.

12. The eye state detection apparatus according to claim 9, wherein, when the reference distribution of the opening amounts is not set by the opening amount reference distribution setting means, the opening degree calculation means calculates the opening degree of the eye based on a distribution of the opening amounts stored in the storing means.

13. The eye state detection apparatus according to claim 9, wherein the opening degree calculation means:
calculates a mode value of the reference distribution of the opening amounts;

sets a threshold value of the reference distribution of the opening amounts, the threshold value being smaller than the mode value; and calculates the opening degree of the eye based on a relative ratio of each of the opening amounts to the mode value and a relative ratio of each of the opening amounts to the threshold value.

14. A method of detecting open and closed states of an eye comprising:

obtaining a plurality of face images of a driver;

calculating an opening amount of an eye of the driver based on each of the face images;

storing the opening amounts in a sequential manner in a memory;

grouping the opening amounts stored in the memory into a plurality of groups in a time-sequential manner;

calculating a group distribution of the opening amounts included in each of the groups;

calculating an entire distribution of the opening amounts included in all of the groups, and setting the entire distribution of the opening amounts as a reference distribution of the opening amounts when a difference among the group distributions of all of the groups is within a predetermined range; and calculating an opening degree of the eye based on the reference distribution of the opening amounts, when the reference distribution of the opening amounts is calculated.

15. The method of detecting the open and closed states of the eye according to claim 14, further comprising:

calculating a monitoring distribution of opening amounts, the monitoring distribution of the opening amounts being calculated based on the opening amounts stored during a predetermined time period after the reference distribution of the opening amounts is calculated; and recalculating the reference distribution of the opening amounts, when a difference between the reference distribution of the opening amounts and the monitoring distribution of the opening amounts is larger than a predetermined value.

16. The method of detecting the open and closed states of the eye according to claim 14, further comprising:

calculating a mode value of each group of the opening amounts; and calculating the entire distribution of the opening amounts included in all of the groups, and setting the entire distribution of the opening amounts as the reference distribution of the opening amounts when a difference among the mode values of all of the groups is within a predetermined range.

17. The method of detecting the open and closed states of the eye according to claim 14, further comprising:

calculating the opening degree of the eye based on a distribution of the opening amounts stored in the memory, when the setting of the reference distribution of the opening amounts is skipped.

18. The method of detecting the open and closed states of the eye according to claim 14, further comprising:

calculating a mode value of the reference distribution of the opening amounts;

setting a threshold value of the reference distribution of the opening amounts, the threshold value being smaller than the mode value; and calculating the opening degree of the eye based on a relative ratio of each of the opening amounts to the mode value and a relative ratio of each of the opening amounts to the threshold value.

\* \* \* \* \*